Sept. 25, 1956     D. W. YOUNG     2,764,646
SENSITIVE DIFFERENTIAL PRESSURE CAPSULE SWITCH
Filed Oct. 21, 1952     2 Sheets-Sheet 1
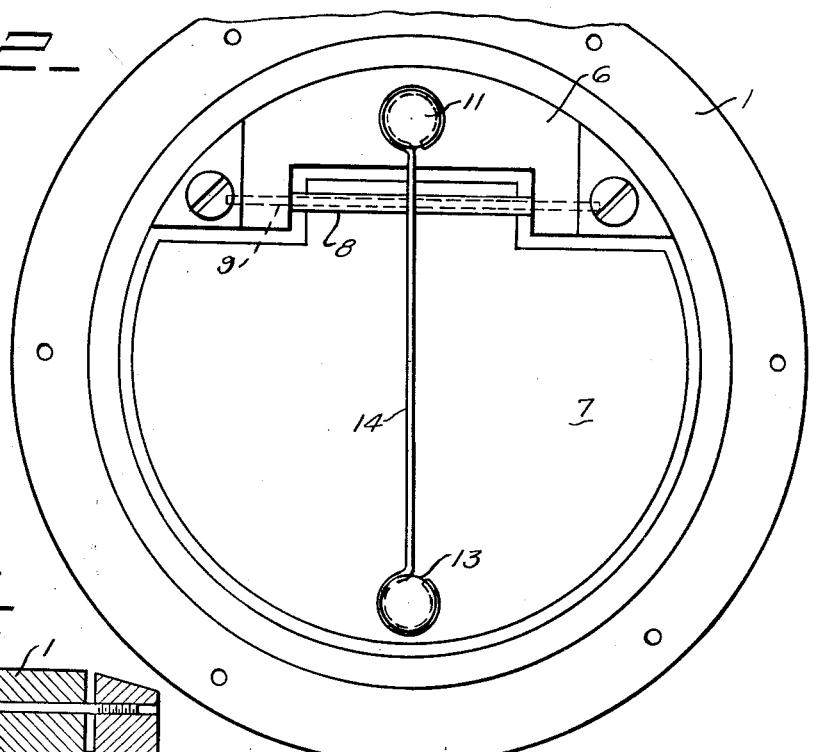
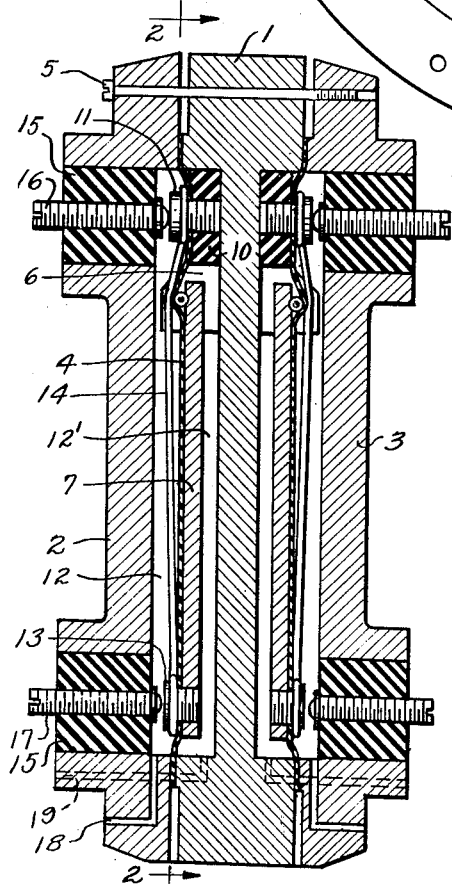
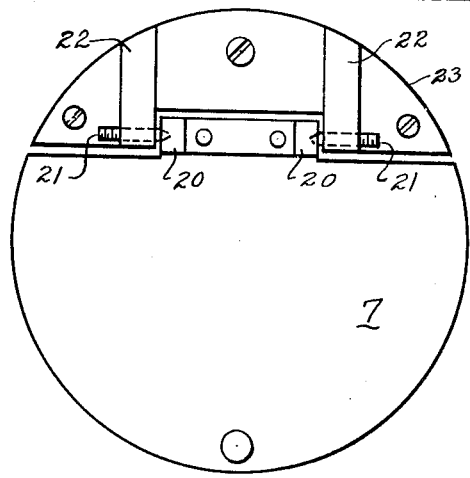
INVENTOR.
DON W. YOUNG
BY Jerome P. Bloom
Wade Koontz
ATTORNEYS Sept. 25, 1956  D. W. YOUNG  2,764,646
SENSITIVE DIFFERENTIAL PRESSURE CAPSULE SWITCH
Filed Oct. 21, 1952  2 Sheets-Sheet 2
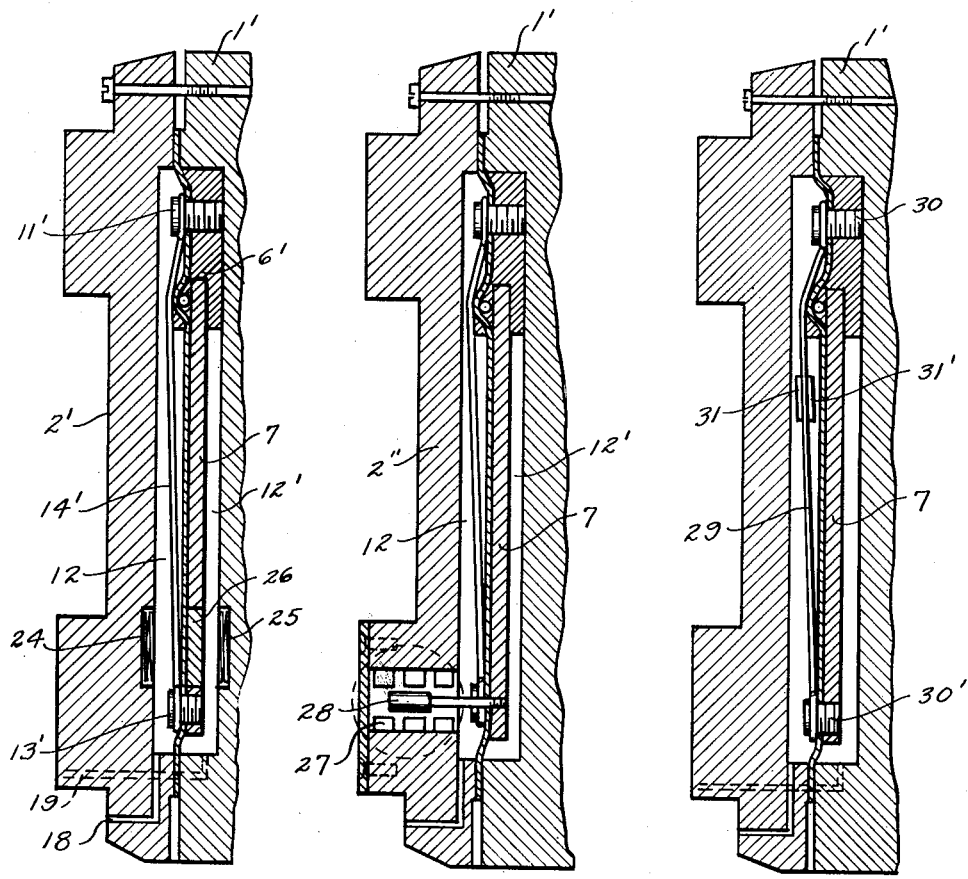
INVENTOR.
DON W. YOUNG
BY Jerome P. Bloom AND
Wade Koontz
ATTORNEYS United States Patent Office 2,764,646
Patented Sept. 25, 1956

2,764,646
SENSITIVE DIFFERENTIAL PRESSURE CAPSULE SWITCH

Don W. Young, Dayton, Ohio

Application October 21, 1952, Serial No. 316,106

8 Claims. (Cl. 200—83)

(Granted under Title 35, U. S. Code (1952), sec. 266)

The invention described herein may be manufactured and used by or for the Government for governmental purposes without payment to me of any royalty thereon.

The present invention relates to a novel and improved differential pressure capsule which is capable of functioning as a transducer. The primary object of the invention is to provide a highly sensitive differential pressure capsule in which a slack flexible sealing diaphragm is interposed to divide the capsule housing into two separate chambers having fluid pressure passage respectively extending thereinto wherein a flap pivotally connected to the housing is secured adhesively to the sealing diaphragm whereby an improved and positive differential pressure indication may be obtained with an elimination of the usual fluctuation inherent in all daphragm type dfferental pressure capsules as well as the elimination of objectionable hysteresis effects normally present in metallic type diaphragm pressure capsules.

A further object of this invention is to provide a differential pressure sensing capsule incorporating a sealing diaphragm member having a reinforcing element secured thereto including signal transmitting elements associated therewith whereby the capsule may function as a transducer upon sensing a differential pressure therein.

Additional objects and applications of the invention will become readily apparent upon reading the following detailed description thereof in conjunction with the accompanying drawings in which:

Figure 1 shows a transverse cross section of the preferred embodiment of the invention.

Figure 2 is a partial cross sectional view taken on line 2—2 of Figure 1 showing the detail of a preferred form of the hinged flap employed in conjunction with the flexible sealing element in my improved differential pressure capsule unit.

Figure 3 shows a modified arrangement which may be provided for the hinged flap shown in Figure 2. Figure 4 shows a partial cross sectional view of a modified form of the invention disclosed in Figure 1. Figures 5 and 6 likewise are partial cross sectional views of modified forms of the invention shown in Figure 1 of the drawing.

The preferred embodiment of the invention shown in Figure 1 provides a compound capsule arrangement which is particularly advantageous for use in a sensing device where individual as well as composite signals are required. The compound capsule is particularly useful in sensing devices in aircraft, for example where both angle of yaw and angle of attack signals are required. The improved capsule is particularly suited for use in a null pressure type angle of yaw and angle of attack indicator such as is disclosed in my previous U. S. Patent No. 2,513,390 since it is extremely sensitive to differential pressure applied thereto. As shown in Figure 1, the composite capsule is formed by a common central flanged panel 1 in conjunction with end plates 2 and 3. Interposed between the elements 1 and 2 and 1 and 3 respectively are thin slack flexible sealing diaphragms 4. Threaded bolts 5, as shown, provide a clamping means for securing the housing elements 1, 2 and 3 together with the diaphragm elements 4 fixedly interposed therebetween. Since the capsule unit is duplicated to either side of the common panel 1 and each unit may be used individually, only a single unit will be described. Panel 1 has a hinge bracket 6 secured thereto to which bracket a substantially rigid flap member 7, is hingedly connected by means of a tube portion 8 thereof being pivotally mounted on a pin 9 secured to the bracket 6. The flap 7 is adhesively secured to the slack sealing member 4 throughout substantially one face thereof which is opposed to the sealing member. An insulating block 10 is mounted in the bracket 6 on the panel 1. A contact screw 11 extending through the flexible sealing diaphragm and into the insulating block 10 has a head portion thereof extending into the pressure chamber 12. Diametrically opposed to the contact 11 is a further contact screw 13 which additionally secures the sealing diaphragm 4 to the flap 7 and has a contact head extending into the pressure chamber 12. Interconnecting the contact heads on the contact screws 11 and 13 is a spring wire 14 which is arranged adjacent the sealing element 4. This spring wire serves as a conducting element as well as to bias the sealing diaphragm element and adhesively secured flap member to a null or predetermined position. Insulating blocks 15 are mounted in the end plate 2 opposed to the respective contact screw elements 11 and 13. Mounted in the insulating blocks and respectively aligned with the elements 11 and 13 are contact screws 16 and 17 having contact heads extending into pressure chamber 12. The head of the contact screw 16 is adjusted so that it is continuously in engagement with the head of the contact screw 11 whereas the contact screw 17 is normally on the verge of contact with the head of the contact screw 13 in a null or predetermined position. Pressure passages 18 and 19 are provided in plates 1 and 2 and respectively extend into pressure chambers 12 and 12'. As has been mentioned previously the capsule structure to the other side of the common panel 1 is a duplicate of that previously described.

With the capsule sealing diaphragm in a normal position the contact element 13 is on the verge of making or breaking contact with the contact element 17. Accordingly the existence of a differential pressure in the chambers 12 and 12' will cause either a positive make or break of contact providing an appropriate signal which may be transmitted to the desired indicator or control element with which the capsule is associated. The use of the slack sealing diaphragm reinforced with the flap member provides an extremely positive and sensitive diaphragm unit. The flap serves as a damper for the normal fluctuation tendencies of the flexible diaphragm providing positive positioning of the contact members and does not give such rigidity as to reduce the sensitivity thereof to differential pressure.

An alternate form of hinge connection for the flap member to the bracket element in the capsule housing may be as shown in Figure 3 wherein the flap member is provided with mounting blocks 20 pivoted on bearing pins 21 mounted in blocks 22 secured to the bracket 23 which is adapted to be secured to the panel 1. Another form of hinging arrangement may be provided by employing jeweled bearings in the flap mounting blocks in conjunction with stainless steel pivots mounted in the hinge bracket; likewise, spaced flexures may be used to hingedly interconnect the flap with the mounting bracket therefor. Another modification that may be made to this pressure capsule would be an addition of a small balance weight appropriately arranged with respect to the pivotal axis of the flap and attached to the flap to obtain a desired mass balance of the flap.

Figure 4 shows a modification of the preferred embodiment of the invention which employs a different type of signal transmitting means. The elements 11′ and 13′ employed in conjunction with the spring wire 14′ to bias the diaphragm to a predetermined or a null position are non-conducting elements. A reluctance type of pick off is employed to give an electrical signal which is proportional to the angle of displacement of the diaphragm unit therein. A coil 24 is fixed in the inner wall of the end plate 2′ and a coil 25 is fixed in the inner wall of the panel 1′ directly opposed to the coil 24 while a small metal disc 26 interposed therebetween is arranged as shown in Figure 4 in the diaphragm unit therein which unit is otherwise similar to that described with respect to Figure 1 of the drawings. When each side of the diaphragm unit is subjected to equal pressure and the respective spaces between the disc 26 and the coils 24 and 25 are equal, a balanced electrical signal results. Where a differential pressure exists, displacement of the disc 26 will result in a change of reluctance in the system and the transmission of the appropriate signal resulting.

Another modification of the invention which is shown in Figure 5 provides as a signal transmitting means a differential transformer 27 arranged in the end plate 2″ opening into chamber 12 and an iron plunger 28 secured to the diaphragm unit and extending within the transformer coils concentric therewith. As a differential pressure occurs in chamber 12 and 12′ a movement of the plunger is effected resulting in a change in voltage output from the transformer to transmit an appropriate signal to an indicator or control unit as in the modification shown in Figure 4. The general capsule arrangement is otherwise identical with that shown in Figure 4.

A further form of the invention shown in Figure 6 utilizes a flat spring member 29 extending between the screws 30 and 30′, which are non-conducting elements herein, rather than employing a spring wire as in the preferred embodiment to bias the diaphragm unit to a null or predetermined position. Here to either side of the flat spring element 29 are connected strain gauge elements 31 and 31′ which on angular displacement of the diaphragm unit due to differential pressure will transmit a signal proportional to the angular displacement due to the flexing of the spring 29, which signal will be delivered to the appropriate control or indicator unit. The capsule structure is otherwise similar to that of the preferred embodiment of the invention.

As can readily be seen my improved capsule is capable of many applications other than the preferred application referred to herein. The improved capsule provides an extreme sensitivity capable of detecting a pressure difference of .002 inch of water providing a degree of sensitivity much greater than the previously known differential pressure capsules. Moreover, the type of structure such as constitutes the invention adapts itheif to such sensitivity even in miniature form. This permits a considerable saving in space and materials necessary to accomplish the desired result and in addition upon miniaturizing the capsule a great improvement in response characteristics obtains. And as can be readily seen the capsule may be single or compound in nature as to its sensing sections. While preferred embodiments and application thereof have been shown and described, nothing herein is intended to limit the invention thereto since various modifications and applications thereof should be readily apparent to those skilled in the art and such lies within the scope of the appended claims.

I claim:

1. A differential pressure capsule comprising a housing, a substantially rigid flap pivotally mounted within said housing, a flexible diaphragm extending across the interior of said housing to divide said interior into two separate chambers and being secured in face to face relation with said flap, a first contact means on said flap spaced from the pivotal axis thereof, a second metallic contact means extending through the wall of said housing for make and break engagement with the first contact means, conducting means adapted to be connected to a source of electrical power from outside said housing connected to said first contact means and pressure conduit means in said housing respectively communicating with said separate chambers whereby a differential pressure therein will result in transmission of an appropriate signal.

2. A differential pressure capsule comprising a generally circular housing, a generally circular substantially rigid flap pivotally mounted within said housing, a thin flexible diaphragm extending across the interior of said housing to divide said interior into two separate chambers and being adhesively secured to one face of said flap over a major portion of the area thereof, metallic contact means on said flap spaced a substantial distance from the pivotal axis thereof, a second metallic contact means extending through the wall of said housing for make and break engagement with said first contact means, the first metallic contact means being movable relative to the second metallic contact means, means providing an electrical connection from outside said housing to said first contact means and separate pressure conduit means in said housing respectively communicating with said separate chambers whereby a differential pressure therein will result in transmisssion of an appropriate signal.

3. A differential pressure capsule comprising a generally circular housing, a generally circular substantially rigid flap pivotally mounted within said housing, a thin slack flexible diaphragm extending across the interior of said housing to divide said interior into two separate chambers and being adhesively secured to one side face of said flap, a first metallic contact means on said flap spaced a substantial distance from the pivotal axis thereof, a second and aligned metallic contact means extending through a wall of said housing for make and break engagement with said first contact means, a flexible conductor connecting said first contact means and said housing and normally biasing said diaphragm to a null or predetermined position, a third metallic contact means extending through a wall of said housing and having its inner end in conducting relation with said flexible conductor and separate pressure conduit means in said housing providing fluid connections to said two separate chambers.

4. A differential pressure capsule comprising a housing, a substantially rigid flap pivotally mounted within said housing, a thin flexible diaphragm extending across the interior of said housing to divide said interior into two separate chambers and being adhesively secured to one face of said flap, a first metallic contact means on said flap spaced a substantial distance from the pivotal axis thereof, a second metallic contact means extending through a wall of said housing for make and break engagement with said first contact means, a metallic stud supported in said housing diametrically opposed to said first metallic contact means, a spring element having its opposite ends secured to said first contact means and to said metallic stud maintaining said flap in a predetermined position, a third metallic contact means extending through a wall of said housing and having its inner end arranged in contact with said metallic stud and separate pressure conduit means respectively making fluid connections with said two separate chambers.

5. A differential pressure capsule comprising a housing, a flexible diaphragm secured to said housing to provide two separate chambers therein, a substantially rigid flap member pivotally connected to said housing in fixed relation thereto and adhesively secured to said diaphragm, means connecting the housing and said flap member biasing said diaphragm to a predetermined null position, separate pressure conduits in said housing communicating with the respective chambers and cooperating signal transmitting means associated with said flap member and housing responsive to a pressure differential between said separate chambers.

6. The structure as set forth in claim 5 wherein the signal transmitting means includes a metal disc mounted in said flap member and oppositely disposed coil members arranged in said housing to either side of said metal disc whereby diaphragm movement causes a change in reluctance in the system to transmit an appropriate signal.

7. The structure as set forth in claim 5 wherein the signal transmitting means includes a transformer mounted in said housing and a metal plunger element connected to said flap member and extending within the transformer coils, whereby differential pressure in said separate chambers causes movement of the plunger within the coil member and a corresponding signal.

8. The structure as set forth in claim 5 wherein the biasing means comprises a flat spring having the signal transmitting means in the form of strain gauge elements connected to either side thereof whereby a differential pressure in said chambers will cause a flexing of the flat spring and a corresponding signal transmission by the strain gauge elements.

References Cited in the file of this patent

UNITED STATES PATENTS

| | | |
|---|---|---|
| 2,035,575 | Summers | Mar. 31, 1936 |
| 2,038,552 | Drabin | Apr. 28, 1936 |
| 2,065,972 | Horstmann et al. | Dec. 29, 1936 |
| 2,111,168 | Chansor | Mar. 15, 1938 |
| 2,173,216 | Stiff | Sept. 19, 1939 |
| 2,202,449 | Fleet et al. | May 28, 1940 |
| 2,439,891 | Hornpeck | Apr. 20, 1948 |
| 2,481,612 | Nicholson | Sept. 13, 1949 |
| 2,495,369 | Elliott | Jan. 24, 1950 |
| 2,509,210 | Clark | May 30, 1950 |
| 2,571,467 | Meuer | Oct. 16, 1951 |
| 2,630,505 | Copping | Mar. 3, 1953 |